(12) United States Patent
Nuovo et al.

(10) Patent No.: US 7,375,973 B2
(45) Date of Patent: May 20, 2008

(54) CASING FOR A COMMUNICATION DEVICE

(75) Inventors: Frank Nuovo, Los Angeles, CA (US); Mark Hutchison, Headley (GB); Lisa Hunt, Farnborough (GB)

(73) Assignee: Vertu Limited, London (GB)

( * ) Notice: Subject to any disclaimer, the term of this patent is extended or adjusted under 35 U.S.C. 154(b) by 486 days.

(21) Appl. No.: 10/250,318

(22) PCT Filed: Nov. 28, 2001

(86) PCT No.: PCT/US01/44316

§ 371 (c)(1),
(2), (4) Date: Dec. 18, 2003

(87) PCT Pub. No.: WO02/054724

PCT Pub. Date: Jul. 11, 2002

(65) Prior Publication Data

US 2004/0102208 A1 May 27, 2004

(30) Foreign Application Priority Data

Dec. 29, 2000 (GB) ................................. 0031787.5

(51) Int. Cl.
*H05K 5/00* (2006.01)
*H05K 5/04* (2006.01)
*H05K 5/06* (2006.01)

(52) U.S. Cl. ...................... 361/752; 361/753; 361/736; 361/814

(58) Field of Classification Search ................. 361/752, 361/814; 455/550, 90, 575
See application file for complete search history.

(56) References Cited

U.S. PATENT DOCUMENTS 3,946,171 A * 3/1976 Kuhfus ....................... 200/5 R
5,372,441 A * 12/1994 Louis ......................... 400/489
5,503,484 A * 4/1996 Louis ......................... 400/489
5,768,370 A 6/1998 Maatta et al. ................ 379/433
6,016,423 A 1/2000 Ross et al. ..................... 455/90
6,031,732 A * 2/2000 Koike et al. ................. 361/816
6,084,962 A 7/2000 Plenge ........................ 379/433
6,164,853 A * 12/2000 Foote ......................... 400/489
6,370,362 B1 * 4/2002 Hansen et al. .............. 455/90.1
6,868,259 B1 3/2005 Kitamura et al. .......... 455/90.3
2002/0048403 A1 * 4/2002 Guerreri ..................... 382/181

FOREIGN PATENT DOCUMENTS

| DE | 29904922 U1 | 5/2000 |
| DE | 20014882 U1 | 2/2001 |
| EP | 0102087 B1 | 12/1986 |
| EP | 0790584 A2 | 8/1997 |
| EP | 0932288 A1 | 7/1999 |
| EP | 1026868 A1 | 8/2000 |
| GB | 2293517 A | 3/1996 |

(Continued)

OTHER PUBLICATIONS

Patent Abstracts of Japan, Kanagata Mukawa:KK, No. 2000036704, Pub'd Feb. 2, 2000.

(Continued)

*Primary Examiner*—Tuan T. Dinh
(74) *Attorney, Agent, or Firm*—Harrington & Smith, PC

(57) ABSTRACT

A casing for a handheld communication device includes a set of individual parts, each individual part being formed from the same metal. The set of individual parts have a purity of at least a hallmark purity level. The set of individual parts is severable from the casing without reducing the purity of the set of individual parts below the hallmark purity level.

29 Claims, 13 Drawing Sheets

FOREIGN PATENT DOCUMENTS

| | | | |
|---|---|---|---|
| GB | 2301945 A | | 12/1996 |
| GB | 2318476 A | | 4/1998 |
| GB | 2331888 A | | 6/1999 |
| GB | 2339993 A | | 2/2000 |
| GB | 2343972 A | | 5/2000 |
| GB | 2346759 A | | 8/2000 |
| JP | 02251436 A | * | 10/1990 |
| JP | 10-304034 | | 11/1998 |
| JP | 2000036704 | | 2/2000 |
| WO | WO-92/01250 A1 | | 1/1992 |
| WO | WO-00/77666 A2 | | 12/2000 |
| WO | WO-01/24072 A1 | | 4/2001 |
| WO | WO-01/43577 A2 | | 6/2001 |
| WO | WO-02/41194 A2 | | 5/2002 |

OTHER PUBLICATIONS

Patent Abstracts of Japan, Kawai Musical Instr, No. 10304037, Pub'd Nov. 13, 1998.

Patent Abstracts of Japan, Daidoji Yasuo, No. 2000295329, Pub'd Oct. 20, 2000.

Digital Communication, TCL999D, Dec. 2000, 3 pages.

"Sony Ericsson to offer luxury cell phones . . . ", Feb. 4, 2002, retrieved from internet http://www.silicon.ie/snews3.shtml#five, 1page.

"Peter Aloisson All shine & Sparkle", 2003, retrieved from the internet, http//www.aloisson.com/start.html, 3 pages.

Nokia 8850 "Pure Elegance in Gold", Products [online at http://www.aloisson.com/prode.html) Peter Aloisson Luxury Phones, 1999.

Nokia 8850, Retrieved [online at http//.www.golds-handys.com/gold-handys/nokia8850.html], no date.

Motorola v3688, "The little stunner in Gold", Products [online at http://www.aloisson.com/prode.html) Peter Aloisson Luxury Phones, 1999.

Motorola v3688, Retrieved [online at http//.www.golds-handys.com/gold-handys/v3688.html], no date.

Ericcson t28s, Retrieved [online at http//.www.golds-handys.com/gold-handys/t28s.html], no date.

Batista, Elisa. "The Jewel of cell phones". Wired news [online at http://www.wired.co./print/0.1294.41525.00.html] Jan. 31, 1999.

* cited by examiner

CASING FOR A COMMUNICATION DEVICE

FIELD OF THE INVENTION

The invention relates to handheld communications devices and in particular apparatus and design to allow for dismantling and recycling of parts.

BACKGROUND OF THE INVENTION

In today's world it is important that design takes into account the destruction of a device at the end of its natural life as well as its appropriate, aesthetic and convenient operation. By including elements in the design of an article that allow for its disassembly at the end of its natural life some of the necessary conditions are in place for recycling. However, without legal compulsion it is difficult to ensure that devices are in fact recycled.

SUMMARY OF THE INVENTION

In accordance with one aspect of the present invention there is provided a casing for a handheld communication device defining an internal space for accommodating an engine providing the functionality of the device and including an operating face carrying a user interface having a plurality of user input elements, the casing comprising a set of elements capable of individual formation and each formed from the same predetermined metal, the metal forming each of the elements having at least a predetermined purity level the set of elements being severable from the casing without retaining residues sufficient to reduce the collective purity of the set of elements below the predetermined purity level.

By ensuring that sets of metal elements having predetermined purity levels are provided on an individual device, similar elements can be recycled together or collectively providing the advantage of convenience and increasing the likelihood that recycling will occur. In embodiments of the invention substantially all the metal parts of the same metal will have suitable purity levels to allow for collective recycling.

One additional way in which to improve the likelihood of an individual making the effort to recycle elements of a device is to make the elements themselves of sufficient intrinsic worth to warrant their retention even when the device is no longer functional.

In embodiments of the invention, the predetermined metal elements are formed from a precious metal. The elements are preferably mechanically, or otherwise, removably fastened to other elements of the casing. This makes it technically feasible as well as being psychologically likely that the component parts will not be discarded without recycling. The amount of precious metal is preferably significant enough to make the handset either likely to be retained or recycled. When the metals are precious it is preferable that each of the elements of the set is severable from the casing without leaving residues attached to the metal element such that if the set of elements is melted down the purity of the resultant metal is at least the predetermined purity level.

The precious metal parts of the set may be gold, silver, platinum or the like. When the individual parts are themselves valuable, the incentive to reuse the material is increased. The parts are preferably above a predetermined purity in order to allow like parts to be recycled together or collectively.

When concerned with precious metals, one measure of purity or fineness as it is sometimes coined, is a hallmark. For hallmarking gold purity is traditionally measured in carats or Karats, depending on nationality. A carat is a portion equal to ¹⁄₂₄. 9 carat gold is $9/24^{th}$s gold by weight, 18 carat gold $18/24$ths etc. The fineness or purity of a precious metal can also be expressed in terms of parts precious metal in 1000 parts by weight alloy.

The acceptable level of impurities in order for an item to be deemed pure enough to warrant a hallmark is dependent on the particular metal concerned. For example, the minimum purity for gold under the Vienna Convention is 375, silver is 800 and platinum 950.

For gold and silver different levels of purity are recognised in different ways. For gold hallmarking in under the Vienna Convention for example, levels of 750 and above, 585 and above and 375 and above are recognised. For silver the levels are 925, 830 and 800 and for platinum the single level of 950.

For articles that are marked with a hallmark, all parts excluding solder and special excluded parts such as engines and those parts that need to have particular characteristics to perform their functions, need to be at least the standard of fineness for the article. There are also requirements on the fineness of solder used in hallmarked articles. This can be used to ensure the purity of the resultant metal when recycled for future use. In embodiments hallmarked in this fashion there is an advantage that all parts have defined purity and can be conveniently recycled collectively. The individual elements are also valuable enough to encourage this activity. The collective purity of a group of elements for the purposes of this application is the purity of the resultant combination on amalgamation. This could be through melting or in other ways known to the skilled man such as dissolving.

In hallmarked embodiments of the invention non-metallic parts are included provided these are clearly distinguishable from the precious metal obtaining the hallmark, and that they are not plated or coloured to resemble precious metals and their extent is clearly visible. Preferably precious metal parts are solid parts and do not require support from an underframe. This ensures that items are not inadvertently included for meltdown or recycling as a set of parts. It also reduces the contaminants such as glue that may be required if such parts are allowed. Embodiments of the present invention seek to achieve this distinction for metals of the casing.

In embodiments of the invention it is preferable that the set of elements comprises substantially all metal elements forming part of the casing. This gives the advantage that there is only one precious metal in the article. Substantially all metal elements is defined for the purposes of this application to mean metal elements sufficient to obtain a hallmark for the article as a whole by one of the assay offices of the countries party to the Vienna Convention. This allows elements whose function requires specific characteristics, not provided by the precious metal, to be formed from more appropriate materials. This applies amongst other things to the engine providing electronic function of the communication device and the key shafts that need to be intricately turned. In embodiments of the invention, the casing may include a further set of elements formed from a different precious metal when the different materials are clearly distinguishable one from the other and can, therefore, be recycled separately. A hallmark of the more precious article can be applied to the article if the different precious metals are clearly visually distinguishable.

Hallmarking an article is, therefore, an easy way to ensure that the parts that appear to be metal of a similar kind are actually of at least a particular purity to allow for assured recycling.

In embodiments of the invention the set of elements may be gold and the predetermined purity level of 750 and above, 585 and above and 375. These are roughly equivalent to 22, 18, or 9 carat hallmarks. The gold may be white or yellow. The set of elements may optionally be platinum.

In some embodiments individual ones of the elements of the set are attached to the casing with solder, the solder is formed from the same predetermined metal having at least the predetermined purity level required by the Vienna Convention to enable a hallmark to be applied, 750 for gold, 550 for silver and 800 for platinum.

DETAILED DESCRIPTION

Embodiments of the invention will be described in greater detail below with exemplary materials being given for some specific or individual elements of the device. In addition the exact material or surface decoration of an element can be changed.

Figure 1:
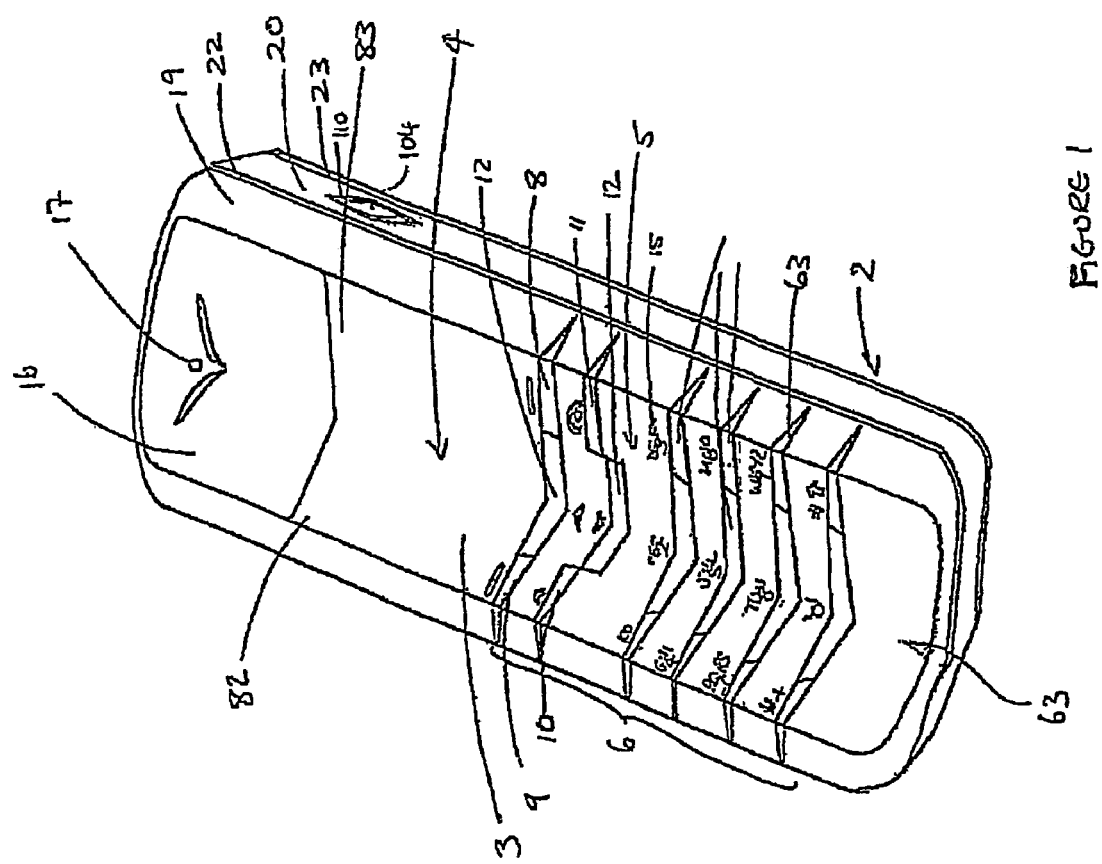
FIG. 1 is a perspective view of a communication device showing one embodiment of the invention.
Figure 2:
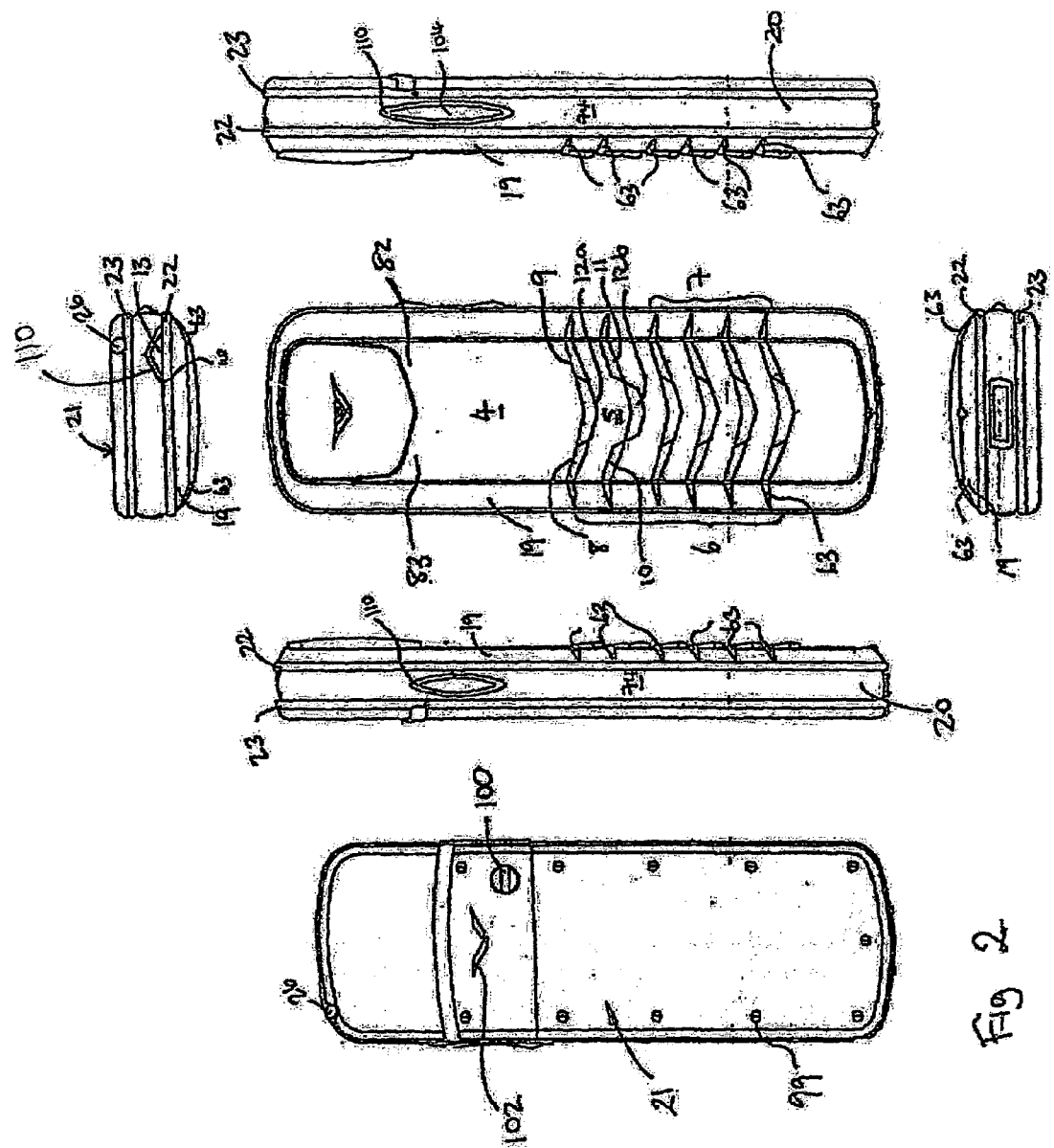
FIG. 2 shows front, rear, sides and top and bottom views of the communication device of FIG. 1.

The embodiment illustrated in FIG. 1 is a communication device 1 with a hallmarked casing 2. The casing 2 of the device has been designed to be recyclable as the requisite metal elements are 22 carat gold.

The casing 2 has an optically permeable front face 3 providing a display region 4 and an input region 5 that includes a key array 6. The key array 6 includes a first group of alphanumeric keys 7, for entering telephone numbers, writing text messages (SMS), writing names (associated with phone numbers), etc. Each of the twelve alphanumeric keys 7 is provided with a figure "0-9" or a sign "#" or "*" respectively. In an alpha mode each key is associated with a number of letters and special signs used in text editing. The key array 6 additionally comprises two soft keys 8, 9, two call handling keys 10, 11, two scroll keys 12, an on/off key 13 and a dedicated key 104.

The functionality of the soft keys 8, 9 may depend on the state of the communication device and position within the menu accessed using the scroll keys 12. The current functionality of the soft keys 8, 9 can be shown in separate fields in the display region 4 just above the respective keys 8, 9.

The two call handling keys 10, 11 are used for establishing a call or a conference call, terminating a call or rejecting an incoming call.

The two direction keys or scroll keys 12, in the handset illustrated are placed centrally on the front surface of the communication device between the display region 4 and the group of alphanumeric keys 7 perform a scrolling function.

The front face 3 is overlaid with a pillow 16 providing apertures 17 to channel sound from a loud speaker 18 and providing an appropriate feel for an element of the device that will be located close to the user's ear. The front face 3 is surrounded by a bezel 19 that is made 22 carat gold. The choice of material for the bezel is one open to selection. Precious metals including gold, platinum, silver, steel amongst others would be suitable. The same applies to the material of the front face protectors. Although for the maximum benefit of the present invention all the metal elements would be formed from the same precious metal. This acts to protect the edges of the front face 3 and can help in some embodiments in securing the elements of the casing 2 together.

The casing 2 is formed from the front face 3 surrounded by the bezel 19, a side frame 20 and a back cover 21. The interface between the side frame 20 and the bezel 19 and the side frame 20 and the rear cover 21 are shielded by rails 22, 23 in this embodiment. The rails 22, 23 hide raw edges from view, and strengthen the casing. The construction of the casing 2 enables it to be opened with ease and broken down into its constituent parts for recycling.

Figure 3:
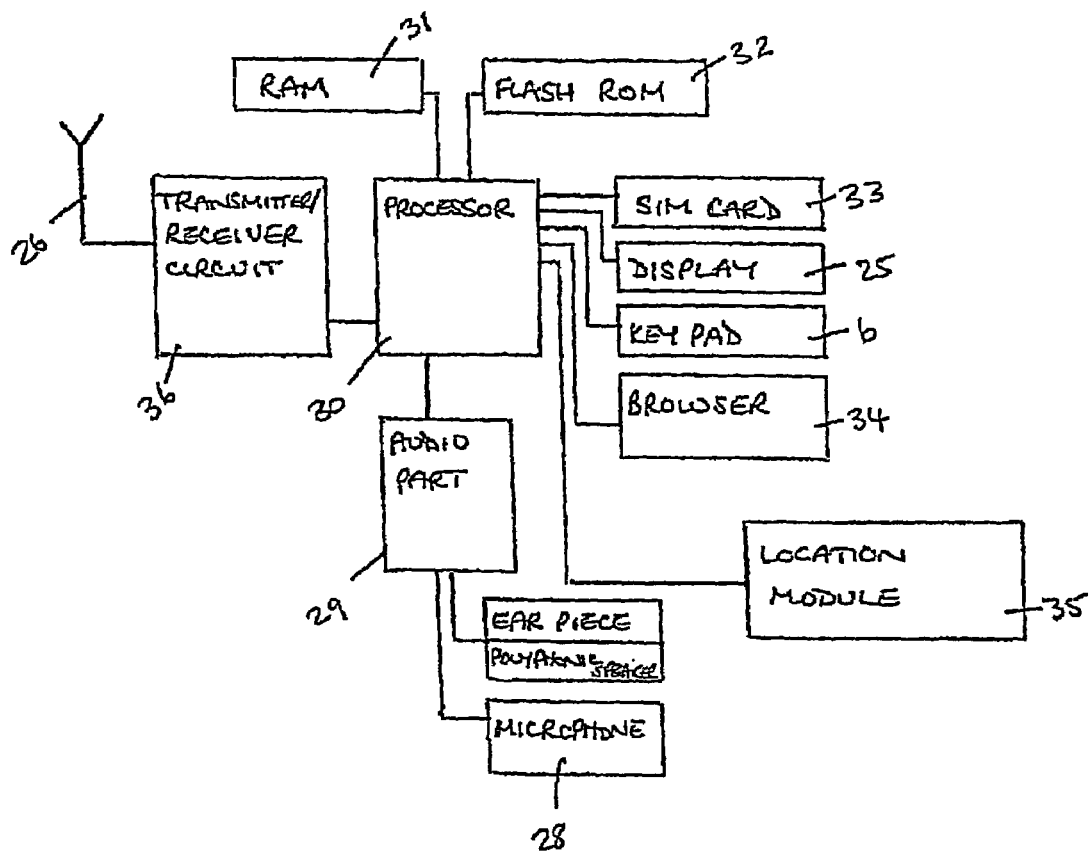
FIG. 3 is a schematic representation of a communication device suitable for embodiments of the present invention.
Figure 4:
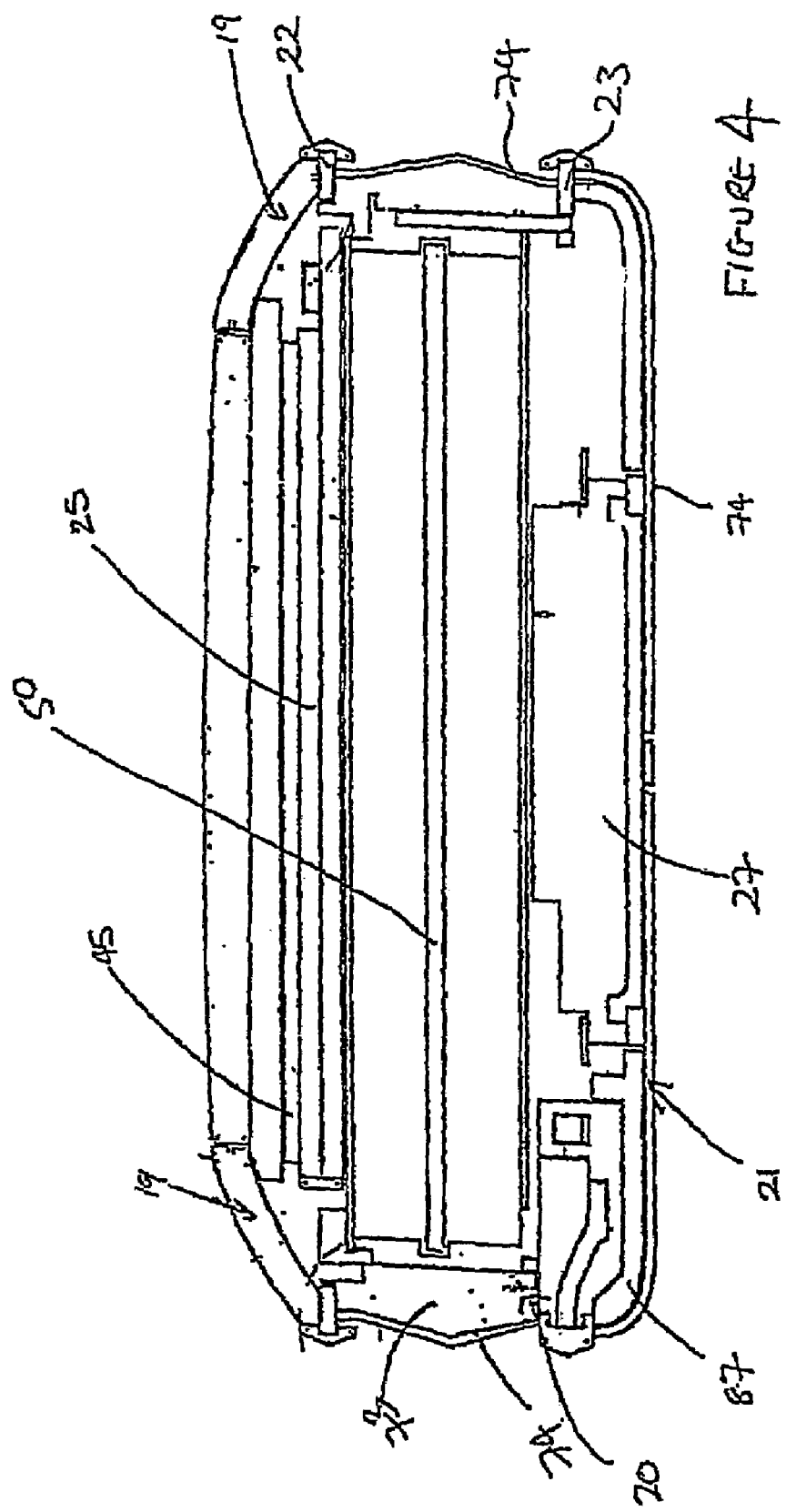
FIG. 4 is a section through the communication device of FIG. 1 in the display region.
Figure 5:
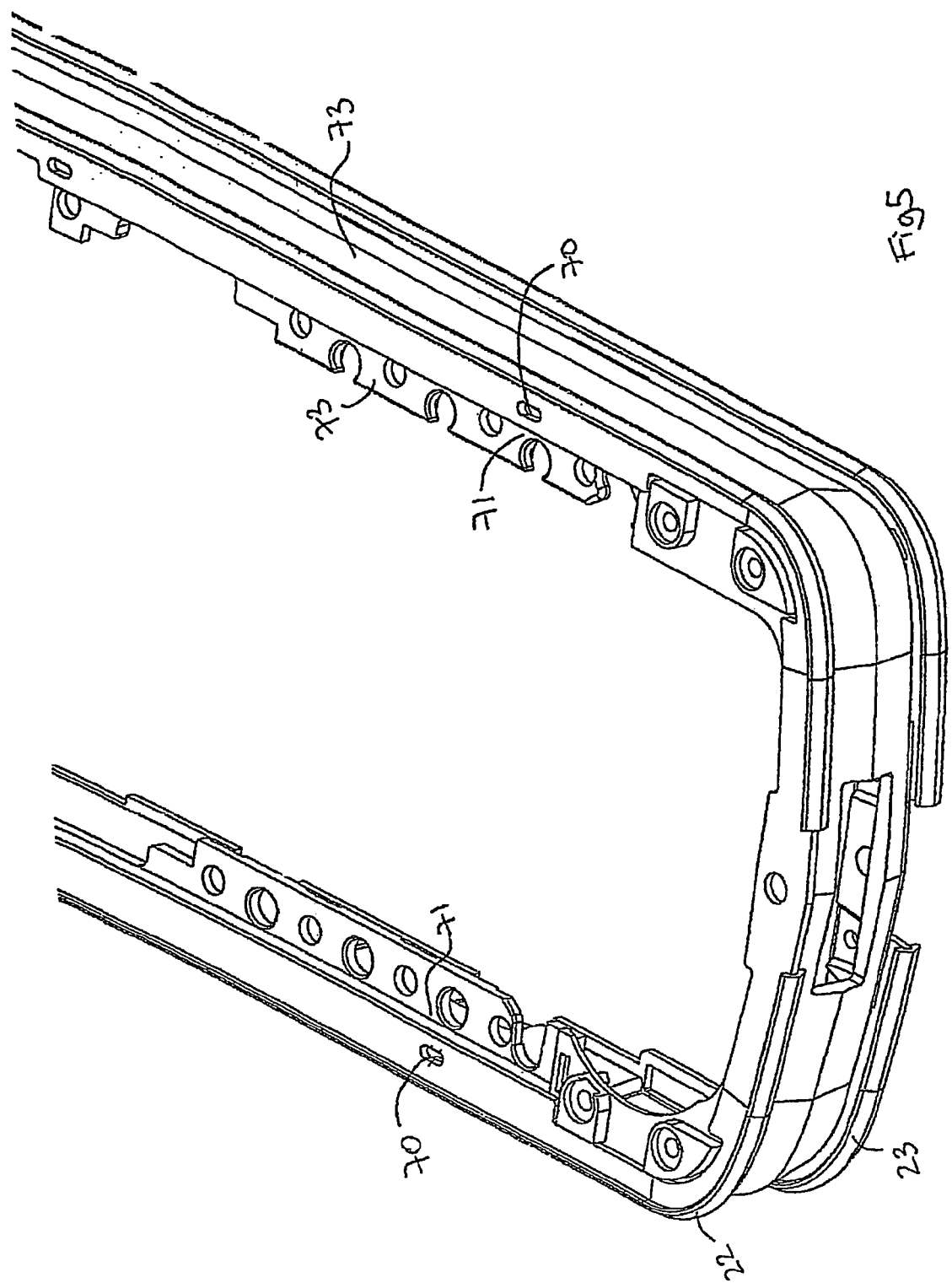
FIG. 5 is a perspective view of a side frame element and located rails for constructing a casing
Figure 6:
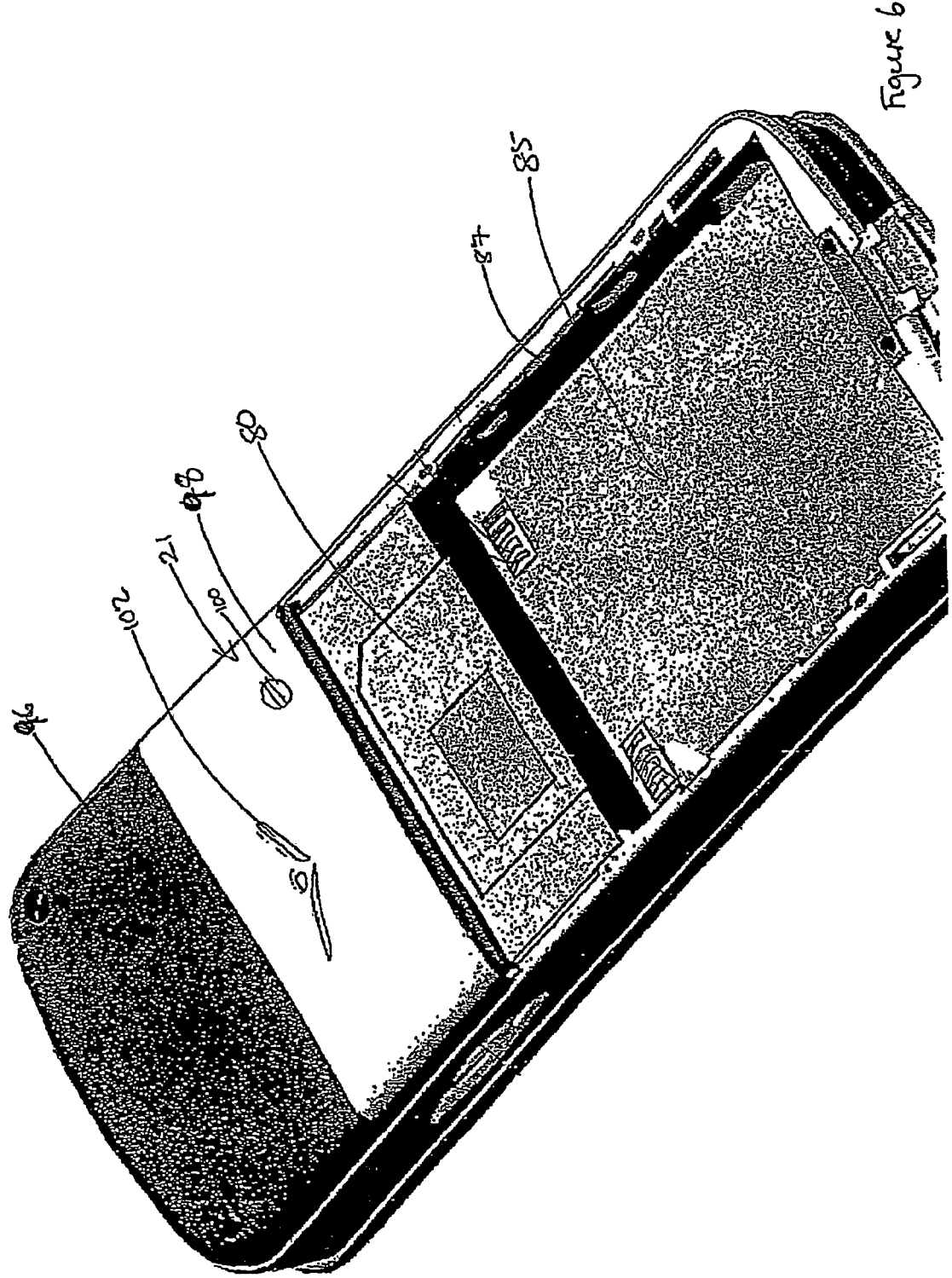
FIG. 6 is a perspective view of the rear of the device with the battery cover removed.

The device will now be briefly discussed with reference to its functional elements. The communication device 1, includes the key array 6, a display 25, an antenna 26, an ear piece speaker 18, a polyphonic speaker 27, and a microphone 28. The communication device 1 is adapted for communication via a wireless telecommunication network, e.g. a wireless network. However, the communication device could also have been designed for a cordless network. FIG. 3 shows schematically and functionally elements of the communication device 1. The microphone 28 records the user's speech, and the analogue signals formed thereby are A/D converted by an A/D converter before the speech is encoded in an audio part 29. The encoded speech signal is transferred to processor 30. The processor 30 may support software in the phone. The processor 30 also forms the interface to peripheral units of the apparatus. These may include a Random Access Memory (RAM) 31 and a Flash Read Only Memory (ROM) 32, a SIM card 33, the display 25, and the key array 6, and perhaps a browser application 34, and a location module 35. The browser application 34 can be used to request and receive information from the Internet. The location module 35 enables the terminal 1 to determine its current position.

The processor 30 communicates with a transceiver 36, e.g. a circuit, which is adapted to send and receive messages in a telecommunication network. The telecommunications network may be a GSM or W-CDMA network, but the invention may also be applied in connection with any other network, including but not limited to other kinds of wireless networks and various forms of cordless phone systems or in dual band phones accessing sets of these systems or networks. The audio part 29 speech-decodes the signal, which is transferred from the processor 30 to the earpiece 18 via a D/A converter.

The 'engine' providing the electronic function of the device does not form part of the casing and as there are particular requirements for the materials used in providing the function is given special dispensation to not be 22 carat gold. This extends to the subframe defining the battery compartment and SIM card holder which is made from stainless steel.

In the illustrated embodiment the edges of the front face 3 is protected by the bezel 19 that sits around the whole of the face. The bezel 19, in this embodiment, is formed from solid gold of the same purity as the other gold elements in the device. The solid metal bezel made from the same precious material allows the device to be hallmarked to that gold purity level.

As can be seen in FIG. 1, the bezel 19 is punctuated with front face protectors 63 whose function will be described in more detail later. These front face protectors 63 are also made from the same carat gold, and in this particular embodiment play a role in holding the casing elements together.

The front face protectors 63 have a tip part 64 that extends over the bezel 19 and a shaft 65 that passes through the bezel 19 and into the plastic side frame 20. Both these parts are made of the same grade precious metal used for the other metal parts of the casing. The shaft 65 may be tightened onto the frame 20 using a nut 95 which is formed from stainless steel. This is allowable as the connection is mechanical, it is not visible and provides a better functional connection. In this case the nut stops the front face protectors from falling out of the device. In one embodiment the shafts 65 are screwed into the tips 64 at one end and into the side frame element 20 at the other although other manners of connection could be employed. The shaft 65 and tip 64 could also be one piece rather than two. The bezel 19 and the transparent face 3 are captured by the front face protector 63 and side frame element 20 as can be seen in FIG. 7b. The front face protectors 63 accordingly grip the transparent face 3 securely between the side frame 20 and the bezel 19. The front face protectors 63 are only located next to the key array 6. In order to secure the transparent face 3 around its perimeter additional stainless steel screws are added to draw the bezel 19 towards the side frame 20 and squeeze the transparent face 3 in place. In one embodiment, the screws thread through the side frame 20 and tap into the bezel 19. These screws are not formed from the precious metal as the characteristics are not so suited to their function as the stainless steel.

Figure 7:
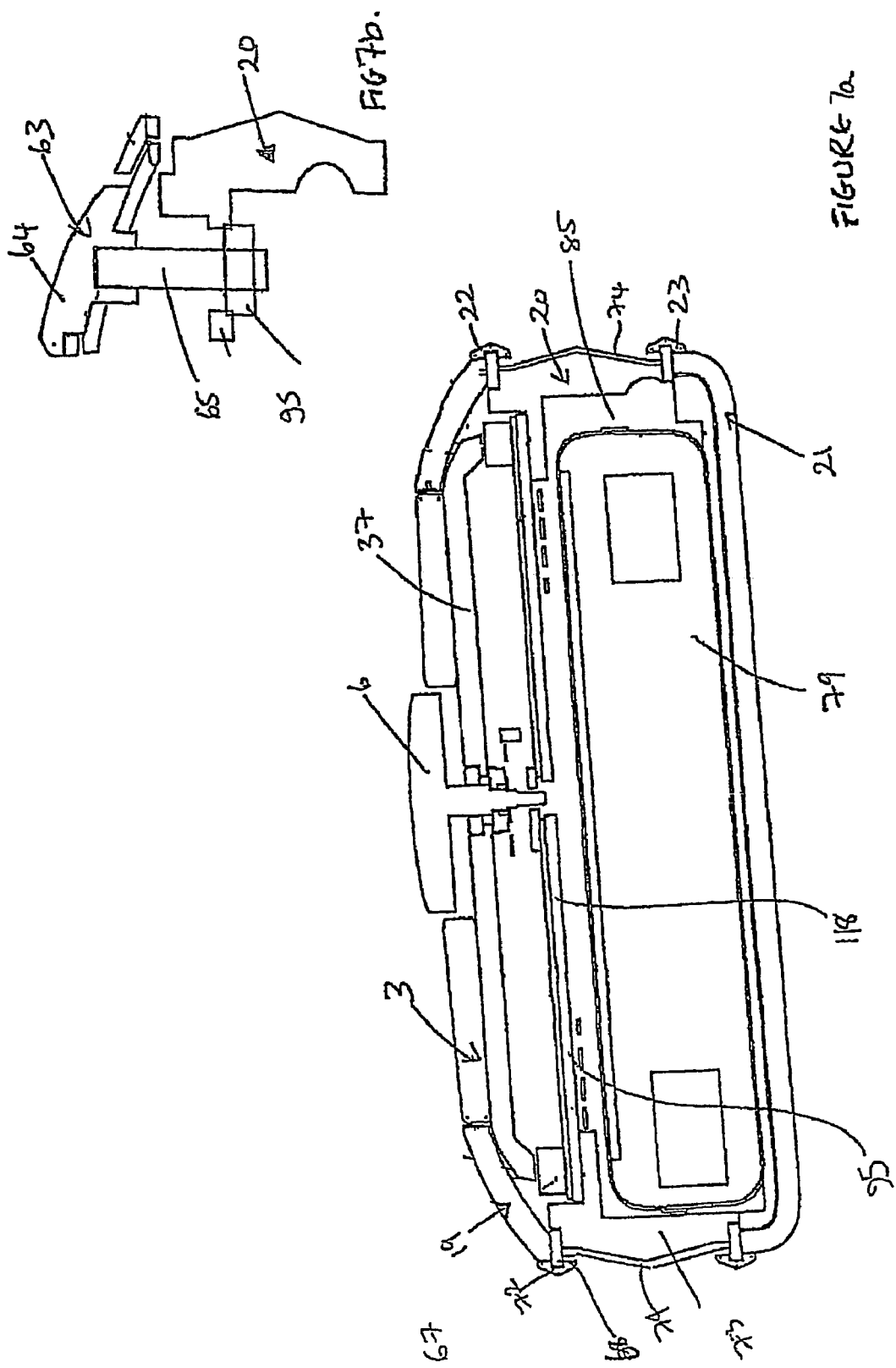
FIGS. 7a and 7b are sections through the communication device of FIG. 1 in the battery region.
Figure 8:
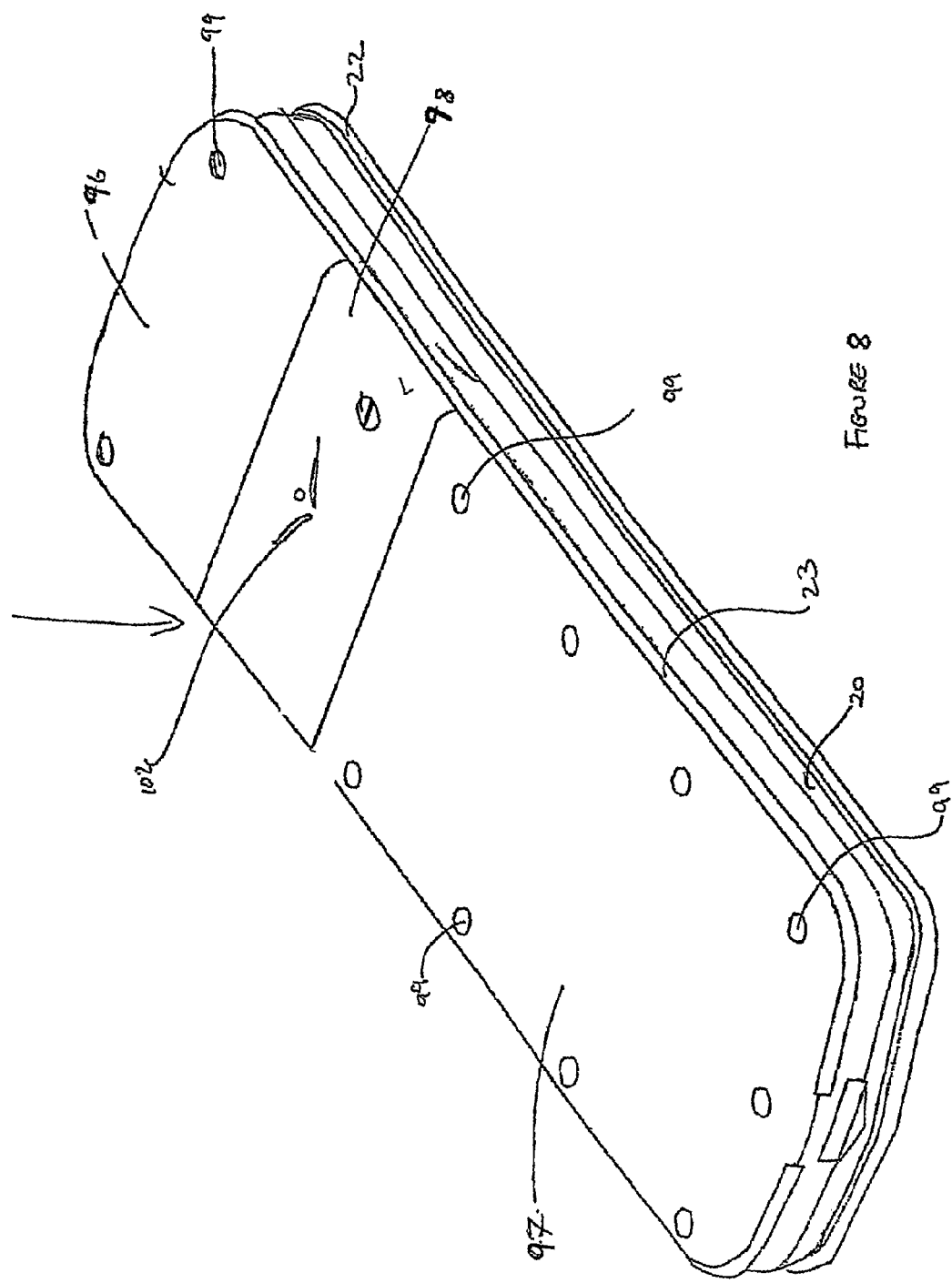
FIG. 8 is a perspective view of the rear of the device with the battery cover in place.
Figure 9:
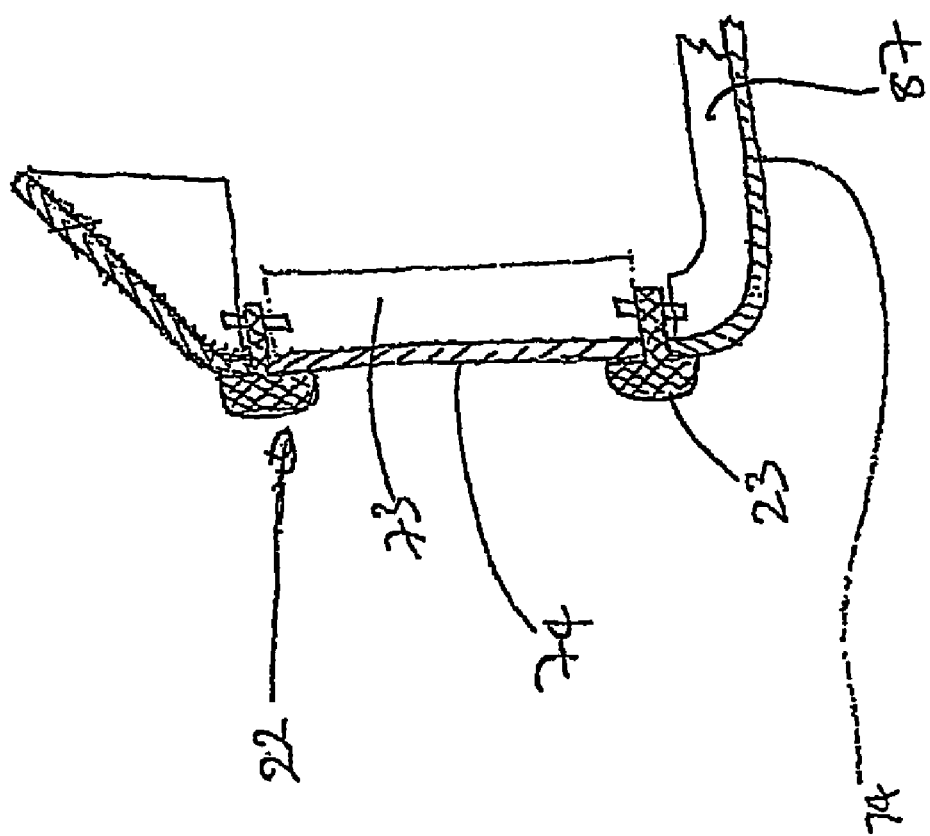
FIG. 9 is a section through the rails.
Figure 10:
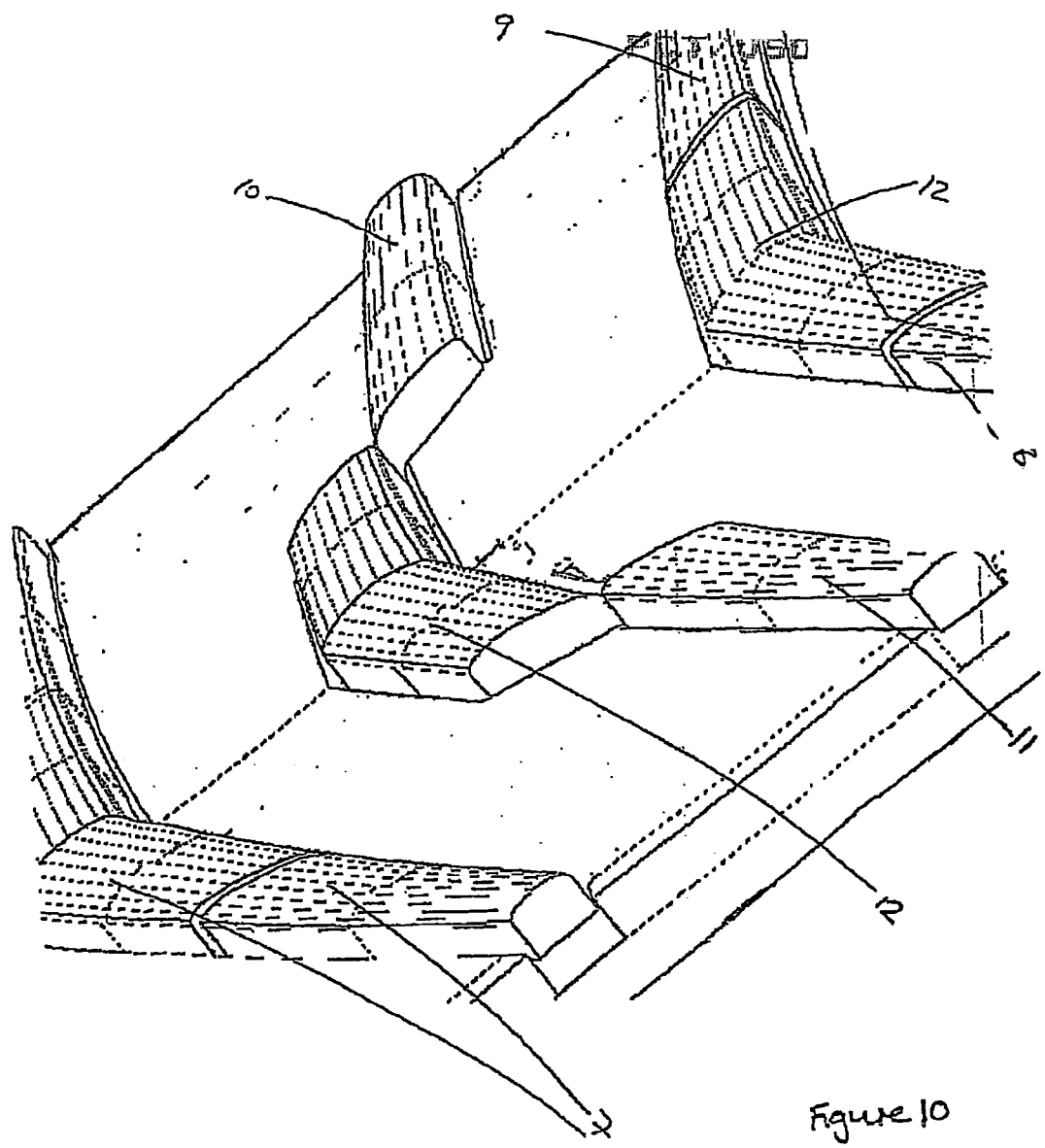
FIG. 10 is a perspective view of part of the input region of the device.
Figure 11:
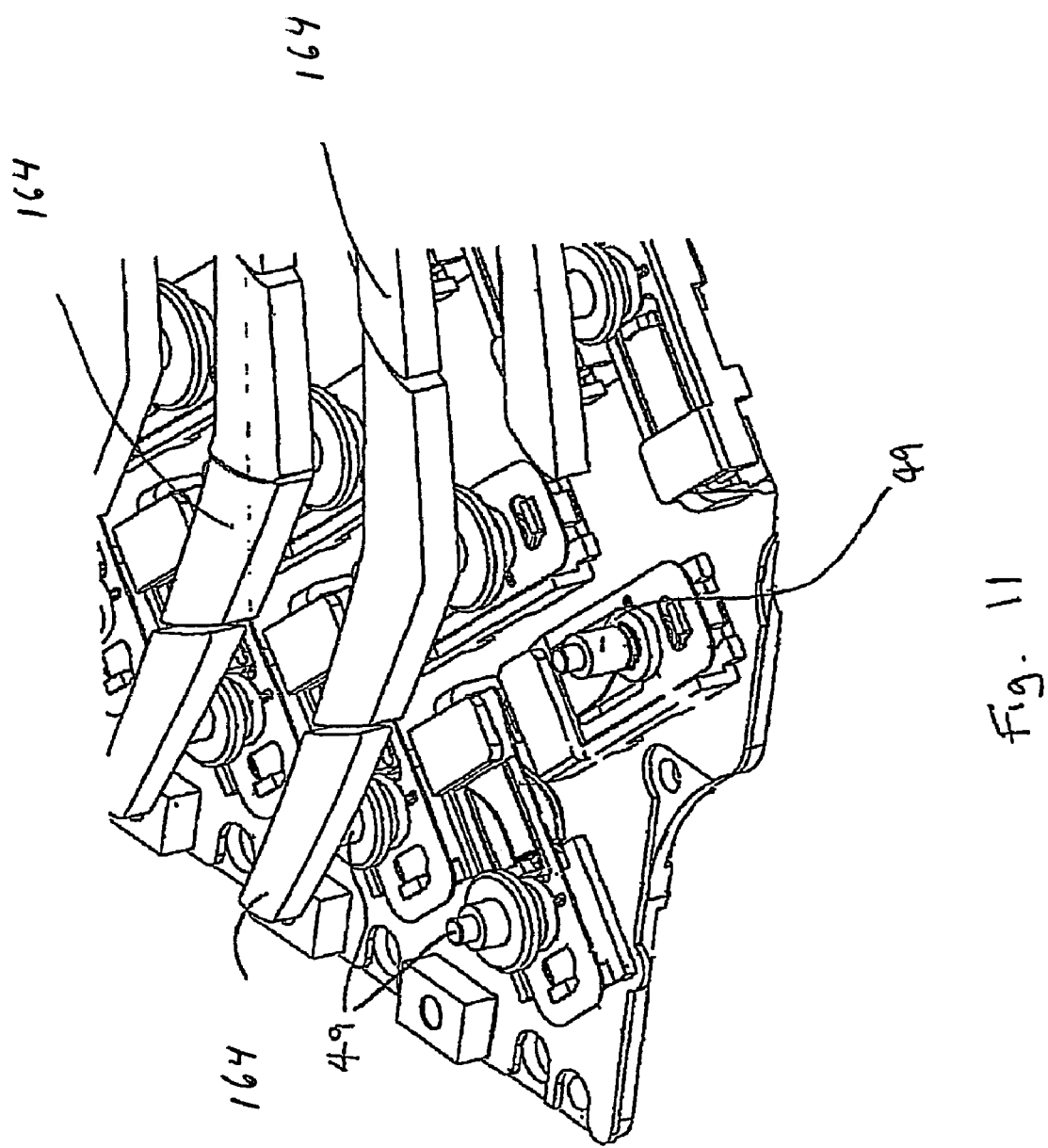
FIG. 11 illustrates the keys with the key tips removed.
Figure 12A:
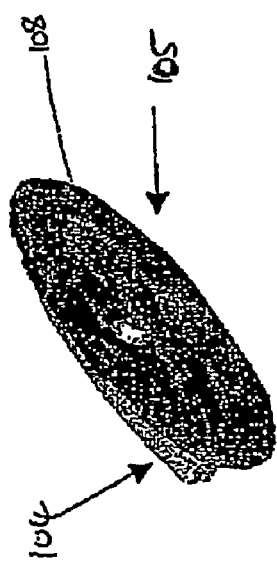
FIGS. 12a, 12b, and 12c illustrate the mechanism for connecting a dedicated key to the housing.
Figure 12B:
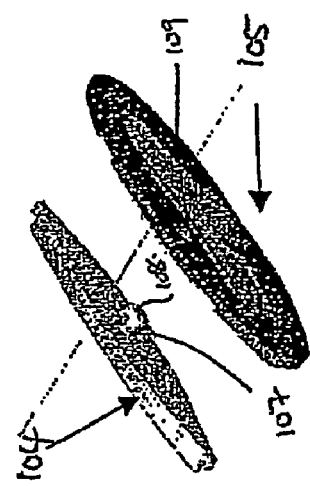
Figure 12C:
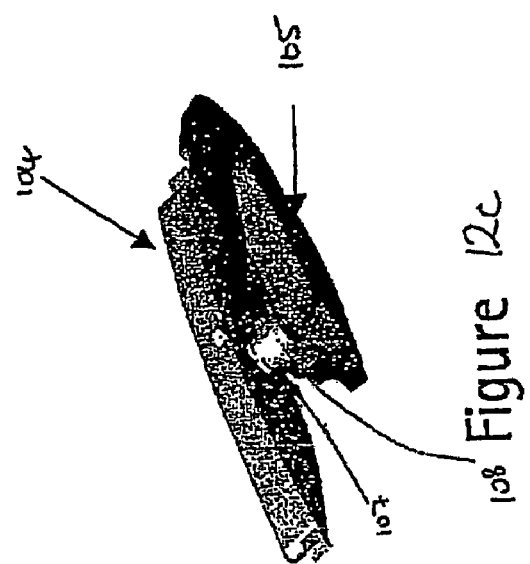
Figure 13A:
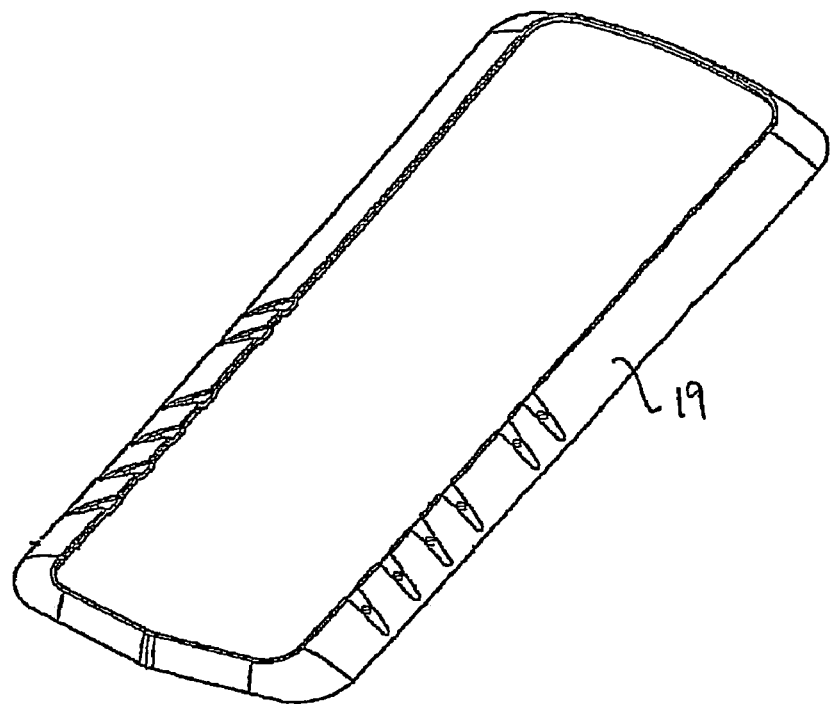
FIGS. 13a and 13b are front and rear perspective views of a bezel respectively.
Figure 13B:
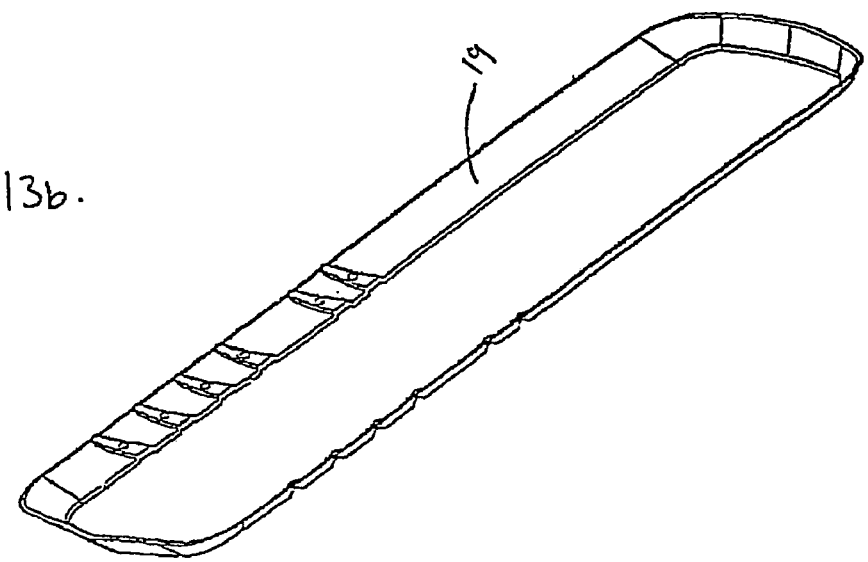

As can be seen in FIG. 7, a first rail 22 is located in the interface between the side frame element 20 and the front face 3. The rail 22 hides the discontinuity between the parts from sight and protects vulnerable edges to enhance the durability of the device 1. The rail 22 may be a stamped metal piece extending around the perimeter of the side frame 20. The stamped piece 68 is trapped between the side frame member 20 and the bezel 19 as these two pieces are drawn together on assembly. The stamped piece has apertures 70 that sit over corresponding projections 71 on the side frame 20 member to prevent it from being withdrawn from between the two parts when in position. The stamped piece acts as a carrier plate to which an additional extruded piece 72 is soldered to provide a seamless finish. The stamped piece 68 and the extruded piece 72 and any solder is of the same precious metal, in this embodiment, gold as the bezel and other metal parts. For this and other connections described in the specification, laser welding is an option. The solder is of the fineness necessary to allow the article to be hallmarked 22 carat gold under the Vienna convention.

The side frame member 20 in this particular embodiment is a plastic support 73 with an exterior cover 74. The cover 74 may be a wood veneer or another layer such as leather or other skin provided it is not metal. The bonding agent most suitable for adhering the layer to the plastic frame member 73 will differ depending upon the materials that need to be adhered. Similarly the back cover 21 in this embodiment may have a plastic frame and be covered with for example a leather or wood veneer. With the flexible veneer materials such as leather, it is preferable for the material to be taut on the frame. This is achieved during the veneering process using conventional techniques.

The constructed casing 2 provides a housing for the printed circuit board 50 holding the engine components, and a battery 79. When the device 1 is a radio telephone, the casing 2 may also provide a SIM card holder 80 to accommodate a SIM card. For operation under some radio protocols this will clearly not be necessary.

Returning briefly to the front of the device, located above the display region 4 is the pillow 16 so named because it designed for the user to rest his or her ear against when making a telephone call. The pillow 16 overlays the ear piece 18 of the device. The pillow 16 provides suitable apertures 17 to channel sound to the user.

The material of the pillow 16 can be chosen to be a material that is inherently warm to the touch. Materials that are thought to be particularly suitable are wood and leather veneers. The shape of the pillow 16 obscures part of the LCD 25, providing opposing triangular sections 82, 83 that are used to indicate battery capacity and signal strength respectively.

To complete the structure, the casing 2 has a rear cover 21 and internal compartments 84, 85 suitable for retaining the engine 24 the battery 79 and in this embodiment a SIM card. The device illustrated, in common with many other radio telephones, advantageously allows access to the battery compartment 85 as the battery 79 may periodically need replacement. In order for the engine to be protected during this activity, the battery 79 is retained in a compartment providing connectors to the engine. Alongside the battery compartment 85 in this embodiment is the SIM card holder 80. Under protocols where a SIM card is used to hold subscription information, the user may wish to remove the SIM card. The battery compartment 85 and SIM card holder 80 are provided by an internal casing element 87 that is secured to the side frame 20. This may be formed from plastic or one of many other suitable materials. In one embodiment the compartments are formed from stamped metal sheet. The metal is preferably stainless steel for its properties, and has special dispensation as it is considered to be part of the 'engine' and is not visible to the purchaser.

The casing 2 is completed by assembling the back cover 21 to the side frame 20. In the illustrated embodiment, the back cover 21 is formed from three pieces 96, 97, 98. A first piece 96 overlays the antenna location. A second piece 98 covers the speaker and a third piece 97, the battery compartment.

The back cover 21 may be made from ceramics which are clearly distinguishable from the precious metal parts. With ceramics, however, despite having many desirable characteristics, for locations near an antenna relevant for devices containing such an element, the dielectric constant of the material interferes with the desired transmission pattern. To provide many of their desirable characteristics without the dielectric constant becoming too high, the first piece 96 can be formed from a material with a lower dielectric constant with a suitable depth of layer deposited on it.

The rear casing element 96 covering the antenna is attached to frame element 20 and in the process captures the second rail 23 similar in construction to the first rail 22 between the side frame 20 and the back cover 21. Again the rail 23 is provided with apertures 70 that are positioned over corresponding projections 71 on the side frame 20 to more securely hold the rail 23 in position when the back cover 21 is attached.

The second rear casing element 98 is attached to the side frame 20 in a similar manner to that described in relation to the first rear casing element. The second rear casing element 98 is formed from the same precious 22 carat gold as the other metal parts and covers the polyphonic speaker 27. It is provided with a suitable aperture 102 to channel sound from the polyphonic speaker 27 that may be used in hands free mode and for providing an audible ring tone. This additional speaker 27 has not been optimised for use in close proximity to the ear as has the speaker 18 located beneath the pillow 16. This allows it to be more effective as a handsfree speaker and enables a greater range of ring tones to be utilised.

A third rear casing element 97 covers the battery compartment 85 and the SIM card holder 80. This element is releasably secured to the other casing elements using screws 99 to allow relatively easy access to the SIM card and battery 79. The battery cover 97 is formed from a ceramic cover with a titanium battery cover support. The titanium is allowed as the material needs to be rigid and is not visible. In a preferred embodiment a quarter turn of a screw 100 releases the cover element 97 to allow it to be removed. The same action can disconnect the battery 79 to allow the SIM card to be removed.

The input region 5 comprises a key array 6, as described above. In this embodiment, the key array is made up of a plurality of individual keys 7-13. Each of these individual keys comprises a key 164 and shaft 49 extending from substantially the centre of the key 164. The keys 164 are formed from the same precious metal. In this embodiment 22 carat gold.

The keys 164 are crafted into the desired shape from the same precious metal, in this embodiment, gold. The key shafts 49 are, however, stainless steel as they need to be strong and intricately turned. The key shafts are screwed into the keys so they are easily removed for separate disposal.

Individual keys such as dedicated key 104 are also formed from gold. However, these are attached to an elastomer undermat for water sealing. As the gold should be extractable from the casing without retaining residues, the gold is not adhered to the elastomer undermat, instead a mechanical connection is created. A protrusion 107 on the gold key having an enlarged tip 108 is forced through an aperture 109 in the elastomer undermat to hold the key firmly attached to the casing. Other single keys such as the power key are attached to the casing in a similar fashion. The metal surround 110 of this and other single keys are also formed from solid gold, crimped into the aperture in the support frame 20. By crimping, resistant fitting and soldering using suitable purity of precious solder, the precious elements of the casing can be conveniently dismantled while retaining the required purity levels. Where appropriate laser welding can also be used.

By forming all the metal parts other than those with incompatible functional requirements from 22 carat gold the whole article can be hallmarked ensuring the owner has confidence that the metal parts are all of the same purity.

Although the device has been described with metal parts being formed from 22 carat gold. Other precious metals could be substituted to meet recognised hallmarking criteria, or with different purity levels should that be desirable. As mentioned in the introductory portion, silver and platinum are candidates as well as both white and yellow gold of same fineness. In particular the fineness to meet the different levels of purity set out in the Vienna Convention. In other embodiments the metal parts could be formed from other recyclable metals such as steel, tin etc.

Aspects of the invention have been discussed with reference to a radio telephone function. It will be clear to the skilled man that these aspects apply equally to other portable communications devices supporting in addition or as an alternative other functions, such as, amongst others electronic diaries, and electronic notepads.

The skilled man will be aware that the materials described above in relation to specific elements of the device can be mixed and matched to suit many distinct design options.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

The invention claimed is:

1. The casing for a handheld communication device comprising:
   a set of separate individual parts, each individual part being formed from the same metal, the set of individual parts having a purity of at least a hallmark purity level;
   at least one non-hallmark purity casing part which is not comprised of a metal having a purity of at least a hallmark purity level, wherein the set of individual parts are fixedly connected with the at least one non-hallmark purity casing part to form the casing,
   the set of individual parts being severable from the casing without reducing the purity of the set of individual parts below the hallmark purity level, wherein the set of individual parts are on an exterior of the casing, and wherein the casing is configured to at least partially surround electronic components of the handheld communication device.

2. The casing according to claim 1, wherein the metal is a precious metal.

3. The casing according to claim 1, wherein the set of individual parts is substantially all of the metal parts forming the casing.

4. The casing according to claim 1, wherein the set of individual parts is severable from the casing without retaining a residue that reduces the purity of the set of individual parts below the hallmark purity level.

5. The casing according to claim 1, wherein at least one of the parts is unsupported.

6. The casing according to claim 1, wherein the parts are made from solid metal.

7. The casing according to claim 1, comprising a further set of individual parts formed from a different metal to the set of individual parts.

8. The casing according to claim 1, wherein the set of individual parts is formed from white gold.

9. The casing according to claim 1, wherein the set of individual parts is formed from yellow gold.

10. The casing according to claim 1, wherein the set of individual parts is formed from platinum.

11. The casing according to claim 1, wherein the metal is substantially made from a single metallic element.

12. The casing according to claim 1, wherein the metal is made from a single metallic element.

13. The casing according to claim 1, wherein the set of individual parts are stationarily connected to the at least one non-hallmark purity casing part.

14. The casing according to claim 4, wherein at least one of the parts is mechanically connected to the casing.

15. The casing according to claim 4, wherein at least one of the parts is laser welded.

16. The casing according to claim 4, wherein at least one of the parts of the set is attached to the casing with solder formed from the same metal as the at least one part.

17. The casing according to claim 7 wherein the set of individual parts and further set of individual parts are substantially all of the metal parts forming the casing.

18. The casing according to claim 7, wherein the different metal used to form the further set of individual parts is more precious than the metal used to form the set of individual parts.

19. The casing according to claim 7, wherein the different metal used to form the further set of individual parts is a less precious metal than the metal used to form the set of individual parts.

20. The casing according to claim 8, wherein the hallmark purity level corresponds to a 375, 585 or 750 fineness hallmark.

21. The casing according to claim 10, wherein the hallmark purity level corresponds to is a 950 fineness hallmark.

22. The casing according to claim 11, wherein the single metallic element is an element from a group consisting of gold, silver and platinum.

23. The casing according to claim 12, wherein the single metallic element is an element from a group consisting of gold, silver and platinum.

24. The casing according to claim 14, wherein the mechanical connection comprises a screw.

25. The casing according to claim 14, wherein the mechanical connection comprises an aperture into which a mating protrusion on one part is flexibly inserted.

26. A casing for a handheld communication device comprising:
at least one casing member which is made of material not having a purity of at least a defined precious metal purity level; and
a set of separate individual parts fixedly connected to the at least one casing member on the exterior of the casing, each individual part being formed from the same precious metal, wherein the set of individual parts have a purity of at least a defined precious metal purity level; and
the set of individual parts being severable from the casing without reducing the purity of the set of individual parts below the defined precious metal purity level, wherein the casing is configured to at least partially surround electronic components of the handheld communication device.

27. The casing according to claim 26, wherein the set of individual parts are stationarily connected to the at least one casing member.

28. A casing for a handheld communication device comprising:
at least one casing member which is made of material not having a purity of at least a defined precious metal purity level; and
a set of separate individual parts fixedly connected to the at least one casing member on the exterior of the casing, each separate individual part having a homogeneous metallic composition; and
the set of individual parts being severable from the casing without changing the homogeneous metallic composition of the set of individual parts, wherein the casing is configured to at least partially surround electronic components of the handheld communication device.

29. The casing according to claim 28, wherein the set of individual parts are stationarily connected to the at least one casing member.

* * * * *